United States Patent
Glueck et al.

(10) Patent No.: US 8,797,027 B2
(45) Date of Patent: Aug. 5, 2014

(54) BOTTOM BRACKET WITH A TORQUE SENSOR UNIT

(75) Inventors: Stefan Glueck, Schweinfurt (DE); Michael Pausch, Oberwerrn (DE); Frank Benkert, Waigolshausen (DE)

(73) Assignee: Schaeffler Technologies AG & Co. KG, Herzogenzurach (DE)

( * ) Notice: Subject to any disclaimer, the term of this patent is extended or adjusted under 35 U.S.C. 154(b) by 631 days.

(21) Appl. No.: 12/809,480

(22) PCT Filed: Dec. 6, 2008

(86) PCT No.: PCT/DE2008/002051
§ 371 (c)(1),
(2), (4) Date: Jun. 18, 2010

(87) PCT Pub. No.: WO2009/079980
PCT Pub. Date: Jul. 2, 2009

(65) Prior Publication Data
US 2011/0006760 A1    Jan. 13, 2011

(30) Foreign Application Priority Data

Dec. 21, 2007 (DE) .......................... 10 2007 062 156

(51) Int. Cl.
G01B 7/30 (2006.01)
(52) U.S. Cl.
USPC .................................... 324/207.25; 74/594.1
(58) Field of Classification Search
CPC .............................. G01L 3/102; B62M 3/003
USPC ................................................. 324/207.25
See application file for complete search history.

(56) References Cited

U.S. PATENT DOCUMENTS

| 6,644,135 B1 | 11/2003 | Kishimoto et al. |
| 7,014,009 B2* | 3/2006 | Yamamoto et al. ........... 180/444 |
| 7,624,653 B2* | 12/2009 | Watanabe et al. ........ 73/862.331 |
| 2009/0031732 A1* | 2/2009 | Wilson et al. ................... 60/792 |

FOREIGN PATENT DOCUMENTS

| DE | 38 20 433 Y | 1/1989 |
| DE | 39 24 910 A | 1/1991 |
| DE | 196 09 981 | 9/1997 |
| DE | 103 01 610 | 8/2004 |
| EP | 0765804 | * 2/1997 ............. B62M 23/02 |
| EP | 0 765 804 | 4/1997 |
| EP | 0 954 746 | 11/1999 |
| EP | 1 978 343 | 10/2008 |
| JP | 2000 335476 | 12/2000 |
| WO | 99/21150 Y | 4/1999 |
| WO | 01/44770 Y | 6/2001 |

* cited by examiner

Primary Examiner — Arleen M Vazquez
Assistant Examiner — Alesa Allgood
(74) Attorney, Agent, or Firm — Simpson & Simpson, PLLC (57) ABSTRACT

A bottom bracket with a torque sensor unit. The bottom bracket has at least one pedal crank, a shaft that is non-rotatably connected to the at least one pedal crank, and a torque detection device for detecting a torque in the region of the shaft. The torque detection device has a first magnetization and a sensor which detects a change of the first magnetized due to a torque passed into the shaft. The bottom bracket allows a reliable and fast detection of torques, especially of the different torques of both pedal cranks. Utilizing the shaft, which is designed as a hollow shaft and the first magnetization, which is arranged on at least one section of the shaft.

18 Claims, 3 Drawing Sheets

BOTTOM BRACKET WITH A TORQUE SENSOR UNIT

This application is a 371 of PCT/DE2008/002051 filed Dec. 6, 2008, which in turn claims the priority of DE 10 2007 062 156.8 filed Dec. 21, 2007, the priority of both applications is hereby claimed and both applications are incorporated by reference herein.

FIELD OF THE INVENTION

The invention relates to a bottom bracket, with a torque sensor unit, for example, for a bicycle, an ergometer or an electric bicycle, such as, a pedelec.

BACKGROUND OF THE INVENTION

In the case of a shaft which is driven by a pedal crank, the prior art discloses detecting the torque which is introduced into the shaft for the pedal crank. If the torque and the angular velocity of the shaft are known, the power which is introduced into the shaft can be simply determined as a product of the torque and the angular velocity. Torque detection apparatuses which allow the instantaneous torque to be detected are of particular interest. Arrangements of a bottom bracket with at least two pedal cranks, which are arranged on a common shaft in a rotationally fixed manner in each case, are also important, it being possible for the torque which is introduced by each of the two pedal cranks to be detected separately and for the torque which results in the shaft to be detected.

The prior art discloses, in particular, a bottom bracket with a torque sensor unit, with the bottom bracket comprising at least one pedal crank, a shaft which is connected to the at least one pedal crank in a rotationally fixed manner, and a torque detection apparatus for detecting a torque in the region of the shaft, with the apparatus comprising a first magnetization and a sensor which detects a change in the first magnetization on the basis of the torque introduced into the shaft. In this case, the shaft is in the form of a solid shaft, the change in the first magnetization is detected by means of a coil which is arranged next to the solid shaft. The torque is detected using the magnetostrictive effect according to which the occurrence of mechanical stresses, as occur when the torque is introduced into the shaft, can lead to a change in the magnetization, in particular if a magnetization is impressed on the material of the shaft. The detected change in the first magnetization can be used to draw conclusions about the internal voltages in the solid shaft, these in turn allowing a conclusion to be drawn about the torque which is introduced into the solid shaft. The prior art describes only the detection of the magnetic field which is introduced into the solid shaft and, in the case of a bottom bracket with two pedal cranks, does not distinguish between which torque the individual pedal cranks introduce into the solid shaft.

DE 103 01 610 A1 describes a first hollow body and a second hollow body which can be mounted on one another in a plurality of segments along a complementary configuration of the end faces. The two hollow bodies are separated by an air gap. A magnetic field passes through the two hollow bodies, this magnetic field changing as soon as the hollow bodies are rotated relative to one another. An arrangement of this type is hardly suitable for use as a shaft in a bottom bracket since the spatial resolution is limited by the number of segments and a change in the magnetic field can be influenced by a change in the distance between the two hollow bodies. It is also disadvantageous that the magnetic field is to be designed as powerful, and therefore the functioning of other, in particular electronic, components may be disturbed.

DE 196 09 981 A1 describes a bottom bracket for a bicycle, with a detection apparatus for, in particular, the torque. The detection apparatus comprises a torsionally rigid internal bearing shaft with in each case an interlocking and force-fitting receptacle for the two pedal cranks. The torsionally rigid internal bearing shaft is connected to a torsionally elastic shaft such that the torsion is transmitted to the torsionally elastic shaft in at least one direction of rotation. The rotation of the torsionally elastic shaft is detected by means of a Hall sensor. The detection apparatus is susceptible to faults, and furthermore the temperature and moisture dependency of the elastic properties of the torsionally elastic shaft has an unfavorable effect. A further disadvantage is that the operator has to expend considerable force in order to rotate the torsionally elastic shaft, and therefore only a reduced torque is available for driving the bicycle and the bicycle is sluggish overall.

EP 0 954 746 B1 describes an apparatus and a method for detecting a torque which is exerted on a bottom bracket shaft. To this end, two signal transmitters, which are axially spaced apart from one another and each transmit a first and a second square-wave signal, are arranged on the shaft. The distances between the flanks of associated square-wave signals can be used to draw conclusions about a torque if an average is taken over at least one full revolution of the shaft. One disadvantage is that only an averaged torque and not the instantaneous torque can be detected. In addition, it is difficult to detect very small torques since the manufacturing tolerances of the signal transmitters play a role.

U.S. Pat. No. 6,644,135 B1 describes a bottom bracket, in the region of which pressure sensors are arranged, the forces acting on the bottom bracket being determined from said pressure sensors. Torques can be detected at best indirectly.

OBJECT OF THE INVENTION

The object of the invention is to specify reliable and fast detection of torques, specifically the different torques of the two pedal cranks, for the bottom bracket mentioned in the introduction.

SUMMARY OF THE INVENTION

An accommodation space is created for the sensor of the torque detection apparatus by virtue of the design of the shaft as a hollow shaft.

The arrangement of the first magnetization on the hollow shaft provides the option of detecting the change in the magnetization both within and outside the hollow shaft.

Furthermore, hollow shafts are lightweight, and therefore hollow shafts rather than solid shafts are increasingly being provided in the region of the bottom bracket.

Provision is preferably made for the hollow shaft to be of two-part design and to comprise a first hollow component shaft and a second hollow component shaft, these hollow component shafts being connected to one another in a rotationally fixed manner. The two hollow component shafts may be joined to one another directly, for example by means of a complementary end toothing system along a joining surface. As an alternative to this, provision may be made for an intermediate piece to be inserted between the two hollow component shafts, said intermediate piece being, for example, a short solid shaft, and said intermediate piece connecting the two hollow component shafts to one another.

Provision is preferably made for the sensor to comprise a magnetic detection means, in particular a coil, a telemetry unit and an evaluation electronics unit, these being combined to form one physical unit. The physical unit may be accommodated largely completely and securely in the hollow shaft and can be mounted in a space-saving manner. Especially if the hollow shaft is formed by two hollow component shafts, the physical unit can be accommodated in one of the two hollow component shafts. The exterior of the physical unit can be designed, in relation to the hollow shaft or the hollow component shaft, such that said physical unit is accommodated in a substantially interlocking manner in the hollow shaft or in the hollow component shaft.

Provision is preferably made for the sensor to comprise a power supply unit, and for the power supply unit to be integrated in the physical unit. Therefore, the sensor may optionally be retrofitted as a substantially functional component group.

As an alternative to integration of the power supply unit in the sensor, provision may be made for the physical unit to be arranged in the first hollow component shaft, and a power supply unit of the sensor to be arranged in the second hollow component shaft. As a result, the weight of the sensor and of the power supply unit of the sensor is distributed over both sides of the hollow shaft. In order to establish a connection between the power supply unit and the sensor, provision may be made for the connecting means, which fixes the two hollow component shafts to one another in the axial direction, to be of electrically conductive design. As an alternative or in addition to this, provision may be made for the connection to be designed in the manner of a plug-type connection between the power supply unit and the sensor. It also goes without saying that, instead of a two-part hollow shaft, a single hollow shaft which is continuous in its axial extent may be provided, the sensor being arranged on the first portion of said hollow shaft and the power supply unit of the sensor being arranged on the second portion of said hollow shaft, with an axial distance being formed between the sensor and the power supply unit of said sensor, for example by the plug-type connection.

Provision is preferably made for the sensor to be arranged in a unit which can be screwed to the outside of the shaft. The sensor can be positioned simply and quickly relative to the first magnetization by means of the screw connection.

Provision is preferably made for the at least one pedal crank to be connected to a pedal crank shaft in a rotationally fixed manner, and for the pedal crank shaft to be accommodated in the hollow shaft, in particular in the first hollow component shaft, in a rotationally fixed manner. On account of this arrangement, the torque which is introduced by the first pedal crank via the pedal crank shaft can be detected and clearly associated with the first pedal crank, so that the power of the leg of the operator which drives the first pedal crank can be independently detected. The torque which is introduced by the first pedal crank can be detected either directly at the pedal crank shaft or in the first hollow component shaft which is connected to the pedal crank shaft in a rotationally fixed manner.

In a refinement of the hollow shaft by virtue of two hollow component shafts which are connected to one another in a rotationally fixed manner, provision is preferably made for the first hollow component shaft, the second hollow component shaft and the pedal crank shaft to be connected in a rotationally fixed manner by means of a common connecting element. Integration of the pedal crank shaft into the bottom bracket is simplified in this way.

Provision is preferably made for the first magnetization to be arranged in the region of the first hollow component shaft, and for a second magnetization to be arranged on a portion of the shaft which is at an axial distance from the first hollow component shaft. The first magnetization allows the torque which is introduced by the pedal crank shaft in the region of the first hollow component shaft to be detected. The second magnetization, which is additionally provided, allows the resulting torque which is introduced into the shaft in total, by the both cranks, to be detected. In this way, the total torque of both pedal cranks which is introduced into the shaft can be detected together and independently of the torque which is introduced by one of the two pedal cranks. In this case, the second magnetization may have a second associated sensor which likewise acts in accordance with the principle of the magnetostrictive effect. The torque which is introduced by the other of the two pedal cranks can then be determined by calculation. Therefore, it is possible to detect the torques introduced by the two pedal cranks, and therefore the power of the two legs of the operator, independently of one another, this being desirable, in particular, with regard to power diagnosis for an operator.

The first sensor and the second sensor preferably each comprise two coils as the magnetic detection means, and therefore the resistance of the sensors to interference is improved.

As an alternative or in addition to this, provision may be made for the first magnetization and the second magnetization to have a common associated sensor, in particular a common coil. The common coil of the two sensors detects the change in the magnetic field due to a first torque in the region of the first magnetization, and the change in the magnetic field due to a second torque in the region of the second magnetization. Conclusions can be drawn about the third torque by calculating the difference between these values or adding these values.

Provision is preferably made for a rotation speed sensor to also be provided, said rotation speed sensor detecting the rotation speed of the shaft. The power of the operator is then given by the product of rotation speed and torque. The rotation speed sensor can be formed independently of the at least one sensor. As an alternative, provision may be made for one of the sensors to also determine, in addition to the torque, the rotation speed of the shaft; to this end, the at least one magnetization can vary in the circumferential direction of the shaft, and therefore the position of the shaft relative to the sensor can be identified. Provision may also be made for the direction of the magnetization to change in circumferential direction, but not for the magnitude of the magnetization to change, while a torque which occurs in the shaft influences the magnitude of the magnetization but does not substantially affect the direction of the magnetization. In this way, changes in the magnetization can be divided into a contribution due to a torque which is introduced into the shaft and a contribution due to a rotation of the shaft.

Further advantages and features of the invention can be gathered from the dependent claims and from the description of preferred exemplary embodiments.

The invention is described and explained in greater detail below using exemplary embodiments with reference to the appended drawings.

DETAILED DESCRIPTION OF THE DRAWINGS

Figure 1:
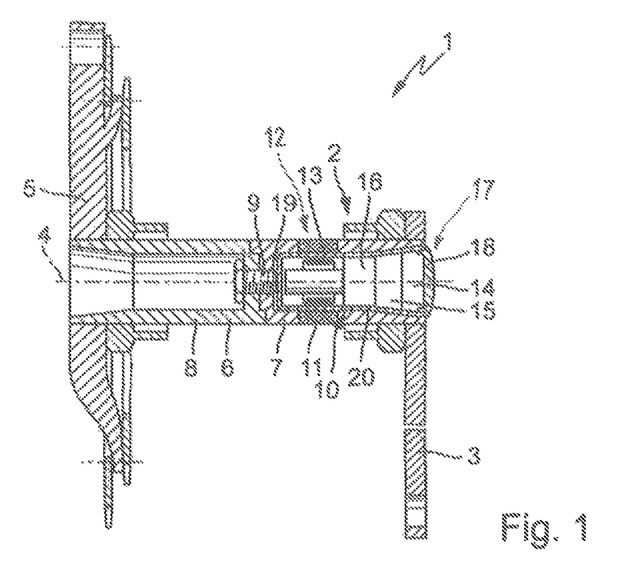
FIG. 1 shows a cross section through a first exemplary embodiment of a bottom bracket according to the invention.

FIG. 1 shows a bottom bracket 1 with a torque sensor unit 2, it being possible for the bottom bracket 1 to be provided, for example, for a bicycle, an ergometer or a Pedelec. The bottom bracket 1 comprises a first pedal crank 3 at which an operator introduces a torque about an axis 4 of the bottom bracket 1 into said bottom bracket.

The bottom bracket 1 also comprises a second pedal crank 5. The two pedal cranks 3, 5 are connected to a shaft 6, which is in the form of a hollow shaft, in a rotationally fixed manner.

The shaft 6 is of two-part design and comprises a first hollow component shaft 7 and a second hollow component shaft 8 which is attached to the first hollow component shaft 7 in a rotationally fixed manner. The first hollow component shaft 7 is attached to the first pedal crank 3 in a rotationally fixed manner, and therefore rotation of the first pedal crank 3 about the axis 4 causes rotation of the first hollow component shaft 7 and of the shaft 6 overall about the axis 4. The two hollow component shafts 7, 8 are each in the form of a hollow cylinder which is open on one side and has a closed end face. The first hollow component shaft 7 and the second hollow component shaft 8 each have, on the end faces which face one another, a complementary structure in the form of a tooth system, and therefore the two hollow component shafts 7, 8 can be joined in a rotationally fixed manner. Furthermore, the two hollow component shafts 7, 8 are attached to one another and fixed to one another in the axial direction by a common connecting means 9, specifically a screw.

The bottom bracket 1 also comprises a torque detection apparatus 10 for detecting the torque which is introduced by the two pedal cranks 3, 5. The torque detection apparatus 10 comprises a first magnetization 11 which is mounted so as to surround a portion of the body of the first hollow component shaft 7 in the region of the first hollow component shaft 7 in the direction of the axial extent of the first hollow component shaft 7. The torque detection apparatus 10 also comprises a first sensor 12 which is associated with the first magnetization 11 and is designed and arranged relative to the first magnetization 11 such that it can detect a change in the magnetic field of the first magnetization 11.

The first sensor comprises a magnetic detection means 13 which is in the form of a coil, a power supply unit 14, a telemetry unit 15 and an evaluation electronics unit 16 with an amplifier. The magnetic detection means 13 detects the magnetic field of the first magnetization 11, but at least a change in the first magnetization 11, and transmits the detected signal to the downstream evaluation electronics unit 16 with the amplifier via the telemetry unit 15. The power supply unit 14 acts on the magnetic detection means 13 and the further components of the first sensor 12. The magnetic detection means 13, the telemetry unit 15, the evaluation electronics unit 16 and the power supply unit 14 are combined to form one physical unit 17 which is in the form of a cartridge and of which the outer shape is such that the physical unit 17 is accommodated in a substantially interlocking manner in the first hollow component shaft 7.

The magnetic detection means 13 is arranged in the physical unit 17 such that the coil is arranged in the immediate vicinity of the first magnetization 11 when the physical unit 17 is in the mounted position in the first hollow component shaft 7. Therefore, the magnetic detection means 13 is positioned correctly in relation to the first magnetization 11 when the physical unit 17 is mounted. The physical unit 17 also comprises a cover element 18 which closes the physical unit 17. A fixing portion 19 is provided at an end of the physical unit 17 which is remote from the covering element 18, it being possible for the physical unit 17 which is introduced into the first hollow component shaft 7 to be fixed to the first hollow component shaft 7 and therefore to the shaft 6 overall at said fixing portion. The fixing portion 19 comprises an internal thread into which a portion of the thread of the common connecting means 9, which is in the form of a screw, of the two hollow component shafts 7, 8 is screwed. At the end which faces the cover element 18, the physical unit has an insertion portion 20 at which it is widened in a V shape and at which the material thickness of the first hollow component shaft 7 is correspondingly reduced.

When the physical unit 17 is inserted into and fixed in the first hollow component shaft 17, as illustrated in FIG. 1, said physical unit can, as the first sensor 12, detect a change in the magnetic field of the first magnetization 11. A change of this type occurs on account of the magnetostrictive effect in the material of the first hollow component shaft 7 when a torque is introduced into the shaft 6 via one of the two pedal cranks 3, 5.

In the first exemplary embodiment, the shaft 6 was formed in two parts by two hollow component shafts 7, 8 which are attached to one another. It goes without saying that a further intermediate piece, for example a further hollow or solid shaft, may be arranged between the two hollow component shafts 7, 8, and that the physical unit 17 may possibly be additionally fixed to this intermediate piece. It also goes without saying that the shaft 6 may also be formed as a continuous hollow shaft over its entire axial extent. The physical unit 17 may be fixed by a threaded connection, it being possible for the thread to be arranged in the region of the insertion portion 20. It likewise goes without saying that the physical unit 17 may also be fixed to the shaft 6 in some other way than by a screw connection, for example by means of a snap-action connection or a bayonet connection. It also goes without saying that guide means, for example guide grooves, may be provided in the region of the shaft 6 or of the hollow component shaft 7 which accommodates the physical unit 17, said guide means making it easier to thread the physical unit 17. It is likewise not absolutely necessary for the physical unit 17 to terminate flush with the cover element 18 at the surface of the pedal crank 3. Instead, provision may be made for the physical unit 17 to be completely accommodated in the shaft 6, in particular within a hollow component shaft 7.

Identical or comparable elements are provided with the same reference signs for the description of the further exemplary embodiments. Differences and deviations are in particular to be identified proceeding from the description of the exemplary embodiment illustrated in FIG. 1.

Figure 2:
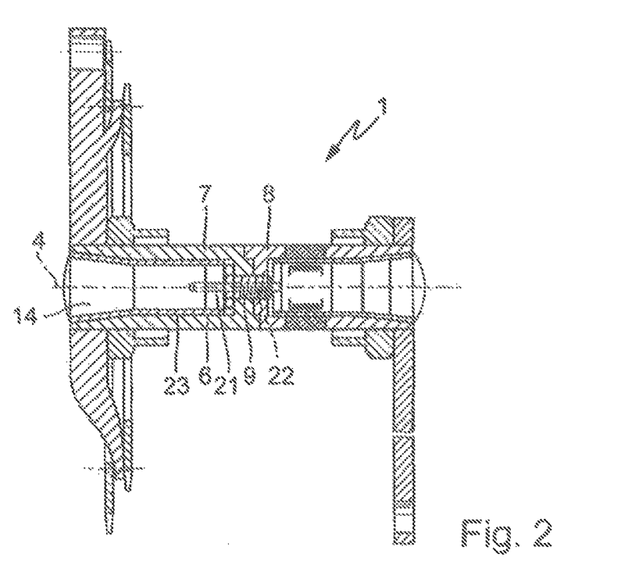
FIG. 2 shows a cross section through a second exemplary embodiment of a bottom bracket according to the invention.

FIG. 2 shows a bottom bracket 1 with a shaft 6 which is in the form of a hollow shaft, and two hollow component shafts 7, 8 which are joined to one another by means of a common connecting means 9, specifically a screw. The sensor 12 is in the form of a physical unit 17 and comprises a magnetic detection means 13, specifically a coil, a telemetry unit 15 and an evaluation unit 16. The sensor 12 has an associated power supply unit 14 which, however, is not arranged in the physical unit 17. The power supply unit 14 is arranged in the second hollow component shaft 8 and is electrically contact-connected by means of a plug-type connection 21. The plug-type connection 21 comprises a contact element 22 which passes through the screw 9 along the axis 4 and establishes electrically conductive contact between the power supply unit 14 and the further components of the sensor 12. The power supply unit 14 is arranged in a receptacle 23 which is designed such that the receptacle 23 is accommodated in the second hollow component shaft 8 in a substantially interlocking manner. During mounting, the receptacle 23 with the power supply unit 14 is inserted into the second hollow component shaft 8 and fixed to the second hollow component shaft 8, for example by being screwed in, and the physical unit 17 with the other components of the sensor 12 is then inserted into the first hollow component shaft 7 and fixed to the first hollow component shaft 7. Electrical contact with the power supply unit 14 is established when the physical unit 17 is fixed.

It goes without saying that a plurality of contact elements may be provided, these contact elements passing through the adjoining end faces of the two hollow component shafts 7, 8 in the manner of a plug.

It also goes without saying that the physical separation of the power supply unit 14 and the other components of the sensor 12 may also be provided for a one-part shaft 6 which is continuous along the axial extent; in this case, the plug-type connection 21 may be designed such that a defined distance is maintained between the receptacle 23 of the power supply unit 14 and the other components of the physical unit 17 in order to position the magnetic detection means 13 correctly in relation to the first magnetization 11.

Figure 3:
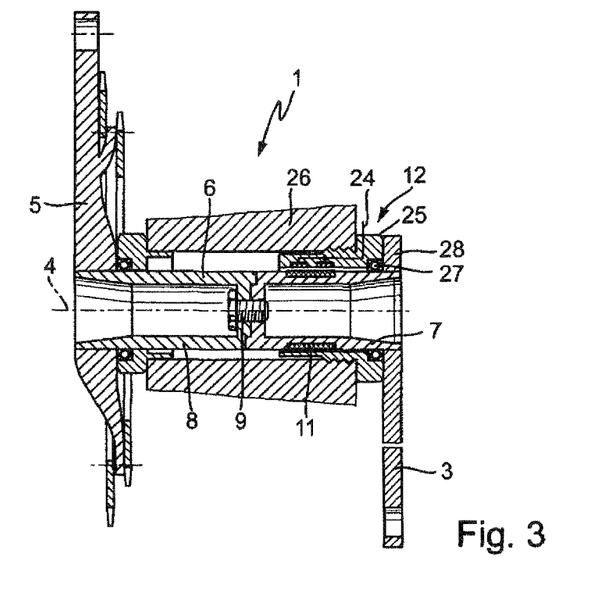
FIG. 3 shows a cross section through a third exemplary embodiment of a bottom bracket according to the invention.

FIG. 3 shows a bottom bracket 1 with a first pedal crank 3 and a second pedal crank 5, with the two pedal cranks 3, 5 being connected to a shaft 6, which is in the form of a hollow shaft, in a rotationally fixed manner. The shaft 6 is of two-part design and comprises a first hollow component shaft 7 which is coupled to the first pedal crank 3 in a rotationally fixed manner, and a second hollow component shaft 8 which is coupled to the second pedal crank 5 in a rotationally fixed manner, with the two hollow component shafts 7, 8 being fixed to one another in the axial direction by a connecting means 9, in the present case a screw. At the facing end faces, the two hollow component shafts 7, 8 have a complementary profiling which ensures that the two hollow component shafts 7, 8 are fixed to one another in a rotationally secure manner.

A circumferential first magnetization 11 is provided in the region of the first hollow component shaft 7 in the region of the outer circumference. The first magnetization 11 has an associated sensor 12 which is arranged outside the first hollow component shaft 7. The sensor 12 comprises a magnetic detection means 13 which is in the form of a coil and which is acted on by a power supply unit or display unit, which is arranged outside the sensor 12, by means of a cable 24. The sensor 12 is accommodated in a unit 25 which can be screwed into an internal thread, which is provided on the bearing receptacle 26, by means of an external thread which faces a bearing receptacle 26. The unit 25 which can be screwed in is supported on the outer circumference of the first hollow component shaft 7 and opposite to a chain ring holder 28, of which only a portion is illustrated, by means of a roller bearing 27. The unit 25 which can be screwed in is oriented substantially concentrically with respect to the axis 4 of the bottom bracket 1 and surrounds at least a portion of the first hollow component shaft 7.

It goes without saying that, as an alternative, a unit 25 which can be screwed in can be provided, said unit being provided only on one side of the hollow component shaft 7 or of the shaft 6 and it being possible for said unit to be screwed into the bearing receptacle 26 or a portion of the shaft 6 by way of its external thread. A unit of this type which can be screwed in is designed in the manner of a simple screw in which the sensor 12 is physically integrated.

Figure 4:
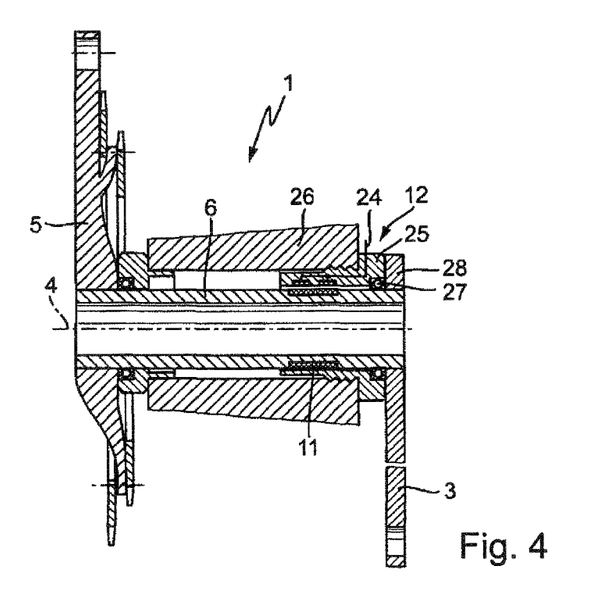
FIG. 4 shows a cross section through a fourth exemplary embodiment of a bottom bracket according to the invention.

FIG. 4 shows a unit 25 which can be screwed in and has a cable 24 and a bearing receptacle 26 for the case of a shaft 6 which is designed as a hollow shaft, is of one-part design and is continuous along its axial extent. In this case, the pedal crank 3 is removable from that side which is remote from the chain ring holder 28, in order to ensure that the system can be mounted.

Figure 5:
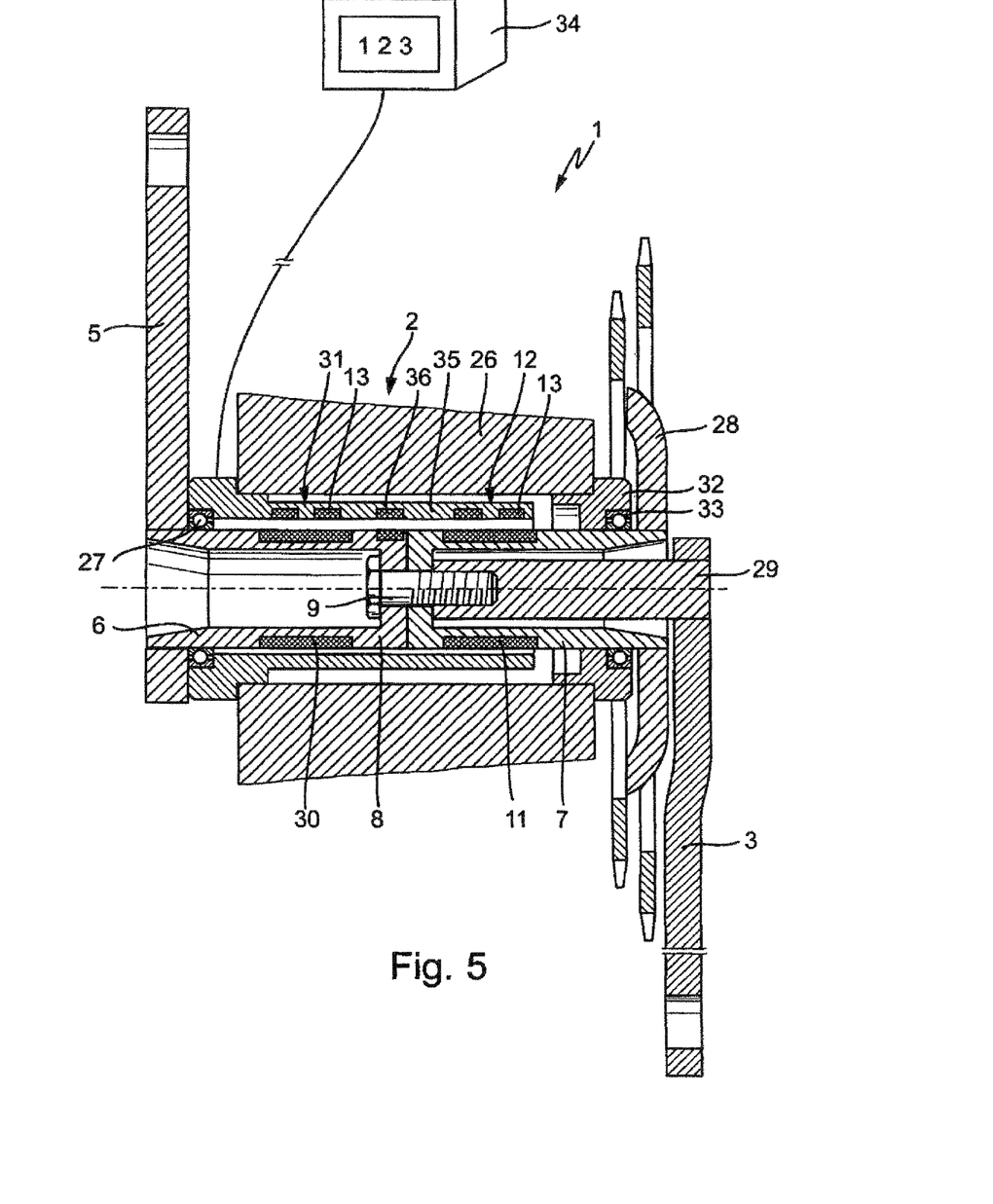
FIG. 5 shows a cross section through a fifth exemplary embodiment of a bottom bracket according to the invention.

FIG. 5 shows a bottom bracket 1 with a first pedal crank 3 and a second pedal crank 5, said pedal cranks each being connected to a shaft 6, which is in the form of a hollow shaft, in a rotationally fixed manner. The shaft 6 is of two-part design and comprises a first hollow component shaft 7 and a second hollow component shaft 8. The second hollow component shaft 8 is directly connected to the second pedal crank 5 in a rotationally fixed manner.

The first pedal crank 3 is directly connected to a pedal crank shaft 29 in a rotationally fixed manner, with the pedal crank shaft 29 being accommodated in the first hollow component shaft 7 and maintaining a distance from the internal wall surfaces of the hollow-cylindrical first hollow component shaft 7. The first hollow component shaft 7, the second hollow component shaft 8 and the pedal crank shaft 29 are attached to one another in a rotationally secure manner, in order to transmit the torque, by means of a common connecting means 9, in the illustrated exemplary embodiment by means of a screw. In particular, the first pedal crank 3 is arranged indirectly in a rotationally fixed manner on the first hollow component shaft 7 and therefore on the shaft 6, with the interposition of the pedal crank shaft 29. A chain ring holder 28 is arranged at the end of the first hollow component shaft 7 in the manner of a portion which is positioned substantially perpendicularly, with the hollow component shaft 7 being mounted on an end portion 35 of the unit 25 which can be screwed in and supporting the chain ring holder 28. The chain ring holder 28 supports chain rings on which the chain, which the operator drives via the two pedal cranks 3, 5, can be mounted and guided.

The bottom bracket 1 further comprises a torque sensor unit with a torque detection apparatus 2 which comprises a first magnetization 11 with a first sensor 12. The first magnetization 11 is provided in the region of the first hollow component shaft 7 on a portion of the outer circumferential surface. The first sensor 12 comprises two magnetic detection means 13 which are in the form of two coils which are axially spaced apart. The torque detection apparatus further comprises a second magnetization 30 which is arranged in the region of the outer circumference of the second hollow component shaft 8 at an axial distance from the first magnetization 11 in the form of a magnetized portion. The second magnetization 30 has a second associated sensor 31 which comprises two magnetic detection means 13, which are likewise in the form of coils, with the two coils of the second sensor 31 having an axial spacing. The two coils of each of the two sensors 12, 31 are together accommodated on a unit 25 which can be screwed in by means of a thread on the bearing receptacle 26. The coils are arranged in the unit 25 which can be screwed in such that, when the unit which can be screwed in is in the screwed-in position, the coils of the two sensors 12, 31 are each arranged in the correct position in relation to the associated magnetization 11, 30. The unit 25 which can be screwed in is supported on the shaft 6 by means of a roller bearing 27. The unit 25 which can be screwed in therefore fulfills two functions, specifically those of accommodating the sensor 12 or the two sensors 12, 31 and providing a bearing and a receptacle for the shaft 6.

The shaft 6 is supported against the bearing receptacle 26 by a further support unit 32 in the region of the hollow component shaft 7, with a portion of the support unit 32 being screwed into the bearing receptacle 26 and being supported against the shaft by means of a further roller bearing 33.

FIG. 5 also shows a display unit 34 which can display to the operator of the bottom bracket 1 the torques or powers which are detected by the sensors 12, 31 and already evaluated within the unit 26 which can be screwed in.

During operation of the bottom bracket 1, the first sensor 12 detects the voltages occurring in the region of the first magnetization 11 in the material of the first hollow component shaft 7, and the second sensor 31 detects the voltages occurring in the region of the second magnetization 30 in the material of the shaft 6. On account of the pedal crank shaft 29 which is interposed between the first pedal crank 3 and the first hollow component shaft 7, the second sensor 31 detects essentially the torques which are introduced during operation of the first pedal crank 3, that is to say specifically the torque due to the operation by one leg of the operator which drives the first pedal crank 3. The second sensor 31 essentially detects the torques occurring in the shaft 6 overall, that is to say the superimposition of the torques which are introduced by the two pedal cranks 3, 5. The torque which is introduced by the second pedal crank 5 can be determined by calculating the difference between the torques which are detected by the two sensors 12, 31, and can be indicated to the operator on the display unit 34.

The bottom bracket 1 also comprises a rotation speed sensor 36 which is arranged in the unit 25 which can be screwed in and which speed sensor 36 is spaced apart from the two coils 13 of the two sensors 12, 31 are arranged in a spaced-apart manner. The rotation speed sensor 36 detects the rotation speed which is performed by the shaft 6 on account of the torque which is introduced in total, that is to say the angular velocity and therefore the number of revolutions of the shaft 6 per unit of time. The rotation speed sensor 36 may be formed by a suitable optical or magnetic marker and a suitable optical or magnetic detection means and determine how many markers are detected in the unit of time. It goes without saying that one of the magnetizations 11, 30 may be designed in such a way that a marker which can be detected by the sensors 12, 31 is provided, so that the rotation speed sensor can be integrated in the torque detection apparatus 2. It also goes without saying that the rotation speed sensor may also be provided outside the bottom bracket 1 and, for example, can detect the speed of the chain which is driven by the bottom bracket 1. As an alternative or in addition to this, the rotation speed sensor may comprise a light barrier which determines how often per unit of time one of the two pedal cranks 3, 5 performs a revolution.

When the torque is known by way of the torque detection apparatus 2 and the rotation speed of the bottom bracket 1 is known by way of the rotation speed sensor 36, the power which is exerted by the operator of the bottom bracket 1 can be calculated by multiplication. This applies both to the power which is exerted in total and also the power which is exerted by each leg of the operator on each of the two pedal cranks 3, 5, it being possible for said powers to be detected and determined independently of one another.

In the above-described exemplary embodiment, each of the two sensors 12, 31 comprised two coils, which are spaced-apart from one another, as magnetic detection means 13 for the two magnetizations 11, 30. It goes without saying that the two sensors 12, 31 may have a common magnetic detection means, for example a single coil which is common to the two sensors 12, 31 and extends along the axial extent of the unit 25 which can be screwed in. The common coil detects a first voltage in the region of the first magnetization 11 in a first portion, and a second voltage in the region of the second magnetization 30 in a second portion. A third voltage which is given as the sum of the first and the second voltage with the correct mathematical sign results over the entire extent of the common coil. The first voltage which corresponds to the change in the first magnetization 11 can be tapped at the coil, as can the second voltage and the resulting total voltage. In this way, two or more of the torques may be simultaneously detected by a single magnetic detection means, in particular a single coil, and in each case be read out individually.

It likewise goes without saying that the torque which is introduced via the first pedal crank 3 may also be detected by a first magnetization 11 which is arranged on the pedal crank shaft 29 or a first magnetization 11 which is arranged on the inside of the first hollow component shaft 7.

In the above-described fifth exemplary embodiment, the pedal crank shaft 29 was in the form of a solid shaft. It goes without saying that the pedal crank shaft 29 may also be in the form of a hollow shaft.

In the case of the unit 25 which can be screwed in and which is described for the third, fourth and fifth exemplary embodiments, it goes without saying that the entire evaluation electronics unit or a part of the evaluation electronics unit may be physically integrated in the unit 25 which can be screwed in (for example as a flexboard).

It goes without saying that the five exemplary embodiments described above, including the indicated modifications, can be combined with one another.

For example, proceeding from the fifth exemplary embodiment (FIG. 5), the change in the second magnetization 30 may be detected by a physical unit 17 which is arranged in the region of the second hollow component shaft 8, as has been described in relation to the first two exemplary embodiments (FIGS. 1 and 2).

Provided that the magnetic detection means 13 were in the form of coils above, it goes without saying that other means which are suitable, in principle, for detecting the change in a magnetic field, for example Hall sensors or Reed sensors, can also be used.

Provided that reference was made to the design of the shaft 6 as a hollow shaft above, it goes without saying that it may be sufficient for only a portion of the shaft 6 to be in the form of a hollow shaft, for example in the region of the rotationally fixed connection to one of the pedal cranks 3, 5, and to otherwise be in the form of a solid shaft. It also goes without saying that the two hollow component shafts 7, 8 do not have to butt substantially flat against another along their end faces; instead, it may be sufficient when said hollow component shafts are in the form of hollow cylinders which are open at both ends and have essentially a line connection only along the end face which is in the form of a ring. It also goes without saying that a portion of one of the two hollow component shafts 7, 8 may also be accommodated in the other of the two hollow component shafts. Provision may also be made for the two hollow component shafts to be in the form of hollow cylinders which are open at both ends and for a portion of an intermediate element to be accommodated in each of the two hollow component shafts, with the intermediate element being provided for connecting the two hollow component shafts to one another. In this case, the shaft would then be considered to be a solid shaft in the region of the intermediate element since the intermediate element fills the hollow space between the respective portions of the hollow component shafts.

In the exemplary embodiments described above, the axial connection between the two hollow component shafts 7, 8 was described by a common connecting means 9 which is in the form of a screw. It goes without saying that the hollow component shafts 7, 8 may also be joined to one another without any further connecting means, for example are joined by a design as a latching, snap-action or bayonet closure, by an adhesive bond, by being pressed in, or as a compression joint with a press fit, for example after one of the components has been preheated.

The invention has been described for a bottom bracket 1 of a bicycle. It goes without saying that the bottom bracket 1 may likewise be the bottom bracket of a recumbent cycle, of a pedal-powered go-kart or more generally of a tracked vehicle which can be driven by means of a driven chain.

LIST OF REFERENCE SYMBOLS

1 Bottom bracket
2 Torque sensor unit
3 First pedal crank
4 Axis
5 Second pedal crank
6 Shaft
7 First hollow component shaft
8 Second hollow component shaft
9 Connecting means
10 Torque detection apparatus
11 First magnetization
12 First sensor
13 Magnetic detection means
14 Power supply unit
15 Telemetry unit
16 Evaluation unit
17 Physical unit
18 Cover element
19 Fixing portion
20 Insertion portion
21 Plug-type connection
22 Contact element
23 Receptacle
24 Cable
25 Unit which can be screwed in
26 Bearing receptacle
27 Roller bearing
28 Chain ring holder
29 Pedal crank shaft
30 Second magnetization
31 Second sensor
32 Support unit
33 Further roller bearing
34 Display unit
35 End portion of the unit which can be screwed in
36 Rotation speed sensor

The invention claimed is:

1. A bottom bracket with a torque sensor unit, comprising:
at least one pedal crank;
a shaft which is connected to the at least one pedal crank in a rotationally fixed manner; and
a torque detection apparatus for detecting a torque in a region of the shaft, with the torque detection apparatus comprising a first magnetization and a sensor which detects a change in the first magnetization on a basis of torque introduced into the shaft,
wherein the shaft is in the form of a hollow shaft, and in that the first magnetization is arranged at least on a portion of the shaft, and
wherein the sensor is arranged on a unit that is one of accommodated at least partially inside the shaft.

2. The bottom bracket of claim 1, wherein a rotation speed sensor s also provided, said rotation speed sensor detecting rotation speed of the shaft.

3. A bicycle, ergometer or Pedelec, comprising a bottom bracket as claimed in claim 1.

4. The bottom bracket of claim 1, wherein the hollow shaft is of two-part design and comprises a first hollow component shaft and a second hollow component shaft, the first hollow component shaft and the second hollow component shaft being connected to one another in a rotationally fixed manner.

5. The bottom bracket of claim 4, wherein the at least one pedal crank is connected to a pedal crank shaft in a rotationally fixed manner, and in that the pedal crank shaft is accommodated in the shaft in a rotationally fixed manner.

6. The bottom bracket of claim 5, wherein the first hollow component shaft, the second hollow component shaft and the pedal crank shaft are connected in a rotationally fixed manner by means of a common connecting element.

7. The bottom bracket of claim 5, wherein the pedal crank shaft is accommodated in the first hollow component shaft.

8. The bottom bracket of claim 6, wherein the first magnetization is arranged in a region of the first hollow component shaft, and a second magnetization is arranged on a portion of the shaft which is at an axial distance from the first hollow component shaft.

9. The bottom bracket bearing of claim 8, wherein the second magnetization has a second associated sensor.

10. The bottom bracket of darn 9, wherein the first sensor and the second sensor each comprise two coils as the magnetic detection means.

11. The bottom bracket of claim 1, wherein the sensor comprises a magnetic detection means, a telemetry unit and an evaluation unit with an evaluation electronics unit, the magnetic detection means, the telemetry unit and the evaluation unit being combined to form one physical unit.

12. The bottom bracket of claim 11, wherein the sensor comprises a power supply unit, and in that the power supply unit is integrated in the physical unit.

13. The bottom bracket of claim 11, wherein the physical unit is arranged in the first hollow component shaft, and a power supply unit of the sensor is arranged in the second hollow component shaft.

14. The bottom bracket of claim 11, wherein the magnetic detection means s a coil.

15. A bottom bracket with a torque sensor unit, comprising:
a first pedal crank and a second pedal crank;
a shaft which is connected to each of the first pedal crank and the second pedal crank in a rotationally fixed manner; and
a torque detection apparatus for detecting a torque in a region of the shaft, with the torque detection apparatus comprising a first magnetization, a second magnetization, and magnetic detection means, which detects a change in the first magnetization and the second magnetization on a basis of torque introduced into the shaft,
wherein the shaft is in the form of a hollow shaft, and in that the first magnetization and the second magnetization are arranged at least on a portion of the shaft,
wherein the magnetic detection means are arranged so that torque introduced by the first pedal crank, torque introduced by the second pedal crank, and an overall torque can be determined from the magnetic detection means, and
wherein the unit on which the sensor is arranged which can be screwed to a bearing receptacle in which the shaft is located.

16. A bottom bracket with a torque sensor unit, comprising:
a first pedal crank;
a second pedal crank;
a shaft connected to each of the first pedal crank and the second pedal crank in a rotationally fixed manner;
a torque detection apparatus comprising a first magnetization arranged in a first region of the shaft and a second magnetization arranged in a second region of the shaft, which is at an axial distance from the first region;
a first sensor detecting a change in the first magnetization on a basis of torque introduced in the shaft and a second sensor detecting a change in the second magnetization on a basis of torque introduced in the shaft,
wherein the first sensor and the second sensor are arranged so that torques introduced by the first pedal crank, torque introduced by the second pedal crank, and an overall torque can be determined from the first sensor and the second sensor.

17. the bottom bracket of claim 16, wherein the shaft comprises a first hollow component shaft, and a second hollow component shaft connected in a rotationally fixed manner, the first region being arranged on the first hollow component shaft, and the second region being arrange d on the second hollow component shaft.

18. The bottom bracket of claim 17, wherein a change in magnetization measured by the first sensor indicates the torque introduced by the first pedal crank, and a change in magnetization measured by the second senor indicates the overall torque.

* * * * *